J. W. STAGNER.
FOOD AND DISH WARMER.
APPLICATION FILED DEC. 24, 1912.
1,067,152.
Patented July 8, 1913.
2 SHEETS—SHEET 1.
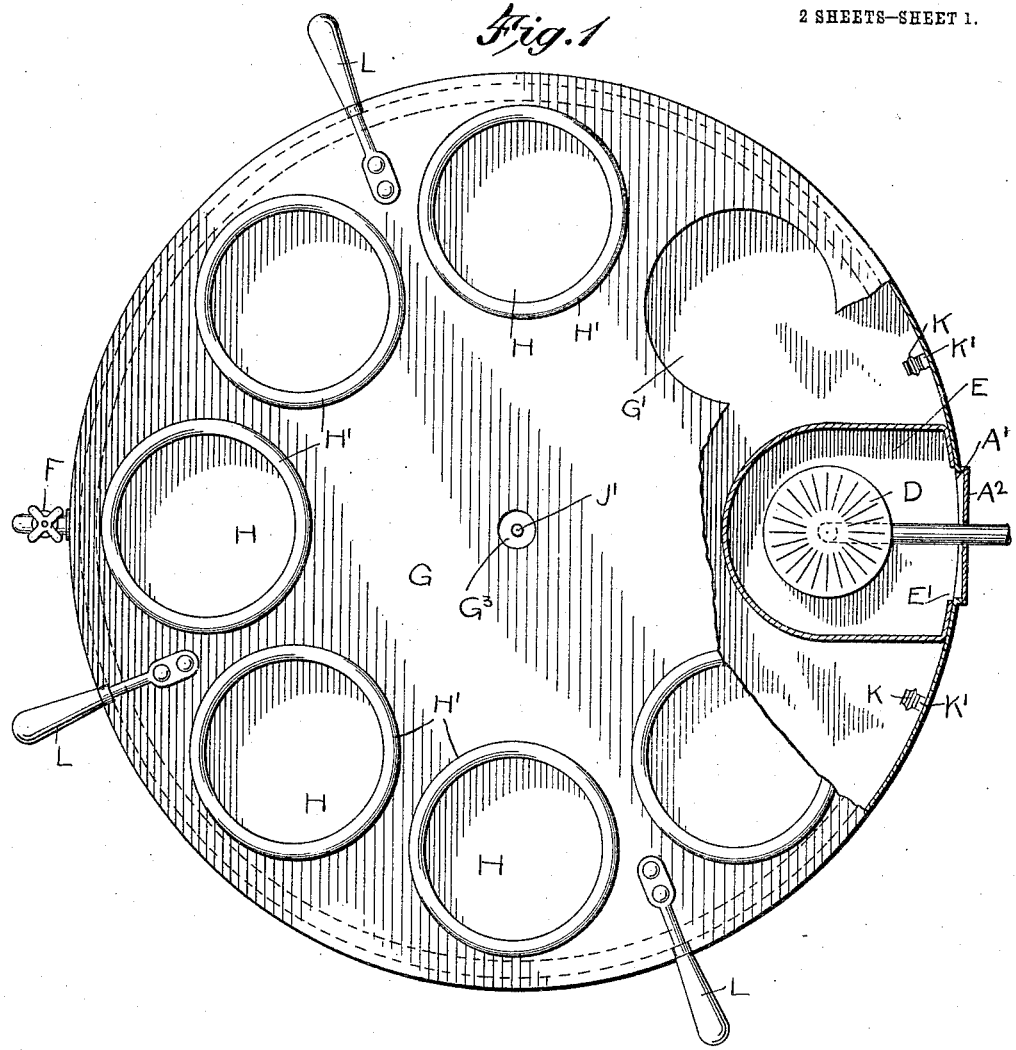
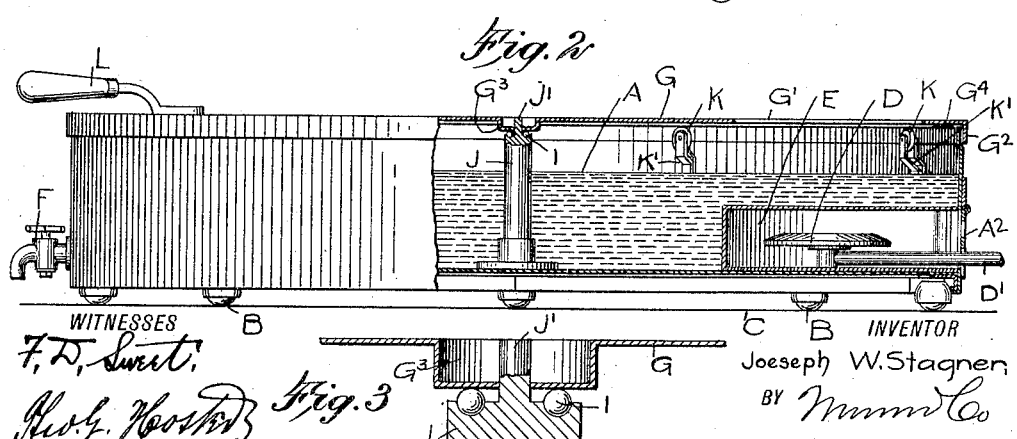

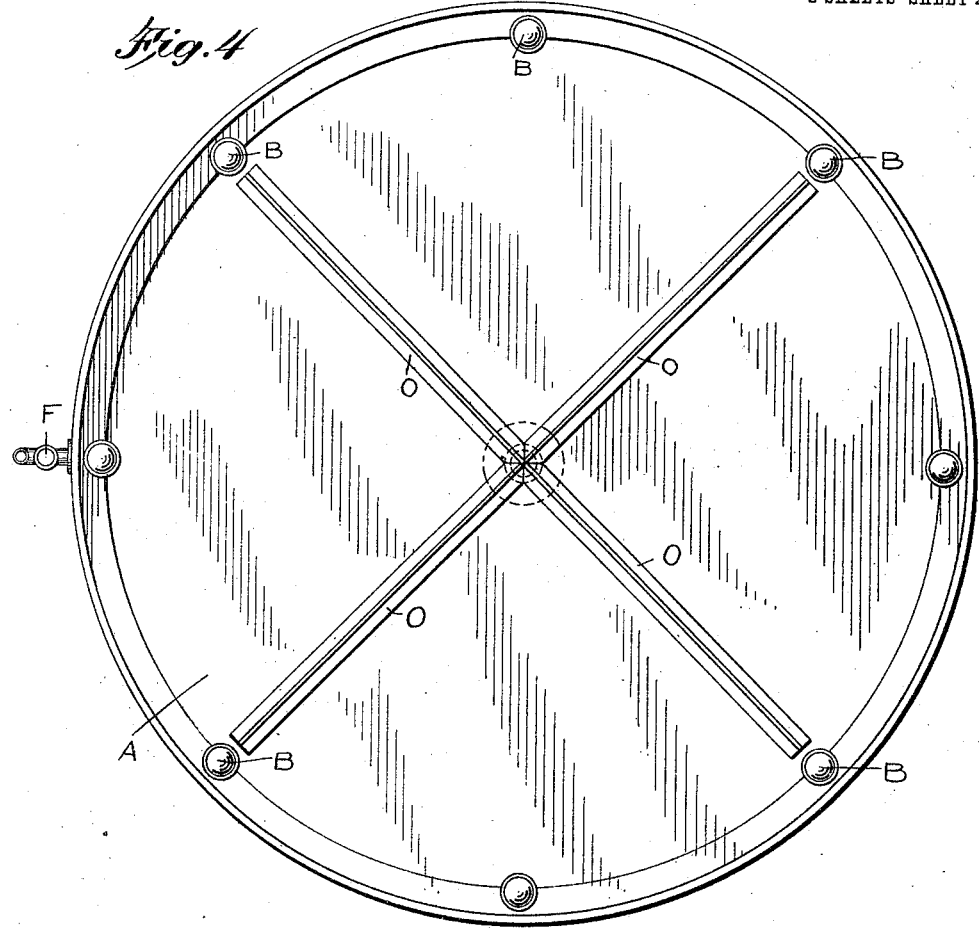
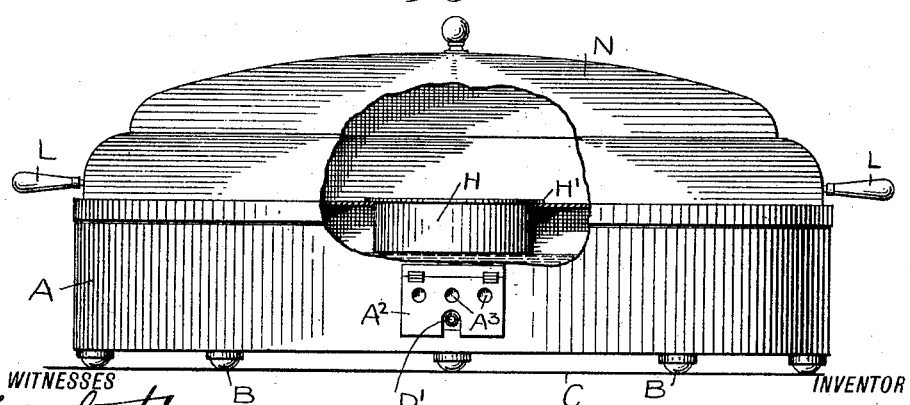

UNITED STATES PATENT OFFICE.

JOSEPH WILLIAM STAGNER, OF SPRINGFIELD, MISSOURI.

FOOD AND DISH WARMER.

1,067,152.  Specification of Letters Patent.  Patented July 8, 1913.

Application filed December 24, 1912. Serial No. 738,489.

*To all whom it may concern:*

Be it known that I, JOSEPH W. STAGNER, a citizen of the United States, and a resident of Springfield, in the county of Greene and State of Missouri, have invented a new and Improved Food and Dish Warmer, of which the following is a full, clear, and exact description.

The object of the invention is to provide a new and improved food and dish warmer, more especially designed for use in hotels, restaurants, boarding houses, homes and other places, and arranged to permit convenient storing of food and dishes with a view to keep the same hot for any desired length of time, and to permit the diners to help themselves to the various foods.

In order to accomplish the desired result use is made of a heating chamber adapted to contain water and provided with heating means for heating the water, the heating chamber being closed at the upper end by a revoluble top having marginal openings for supporting vessels, to suspend the same within the heating chamber, and to be thus under the influence of the water and steam in the heating chamber, the central space of the said cover being adapted to support dishes to be warmed.

A practical embodiment of the invention is represented in the accompanying drawings forming a part of this specification, in which similar characters of reference indicate corresponding parts in all the views.

Figure 1 is a plan view of the food and dish warmer with the cover removed and part of the revoluble top broken away. Fig. 2 is a sectional side elevation of the same, parts being shown in elevation; Fig. 3 is an enlarged sectional side elevation of the central bearing for the revoluble top; Fig. 4 is an inverted plan view of the food and dish warmer; and Fig. 5 is a reduced side elevation of the same with the cover in position and parts broken out.

The heating chamber A is preferably made cylindrical in shape and is provided at the bottom with suitable casters B for supporting the heating chamber on a table C or other suitable support. The heating chamber A is adapted to contain water heated by suitable heating means, such, for instance, as a gas or other burner D arranged within a burner chamber E formed within the heating chamber A, as plainly indicated in Figs. 1 and 2. The burner chamber E has a side opening E' registering with the opening A' in the side of the heating chamber A, the opening being normally closed by a suitable door $A^2$ hinged or otherwise fastened to the outer surface of the side of the heating chamber A. The burner D is provided with a supply pipe D' extending through an opening in the door $A^2$ (see Figs. 1, 2 and 5) to permit of connecting the burner by a hose or other means with a chandelier or other means for supplying gas to the burner D. It is evident that other burners or heaters may be used for heating the water contained in the heating chamber A. The door $A^2$ is provided with openings $A^3$ for the admission of air to the burner D.

The side of the heating chamber A is provided with a suitable faucet F for drawing off the water from the heating chamber A whenever it is desired to do so. The upper open end of the heating chamber A is closed by a revoluble top G provided with marginal openings G' for the reception of vessels H adapted to contain food, each vessel having a top flange or rim H' seated on the top G so that the latter supports the vessels H and holds the same suspended within the heating chamber A so that the said vessels are under the influence of the heated water and steam contained in the steam chamber A. By the arrangement described the food contained in the vessels H can be kept hot for any desired period.

By arranging the openings G' and the vessels H at the margin of the revoluble top G sufficient space is left at the center of the top for storing dishes to be warmed. The top G is flat and is provided at its margin with a depending flange $G^2$ extending over the upper end of the heating chamber A so as to properly close the latter, and the said revoluble top G is flat and is provided at its center with a depressed portion $G^3$ resting on ball bearings I carried by a post J erected within the heating chamber A and attached to the bottom thereof. The post J is provided with a reduced terminal J' at its upper end extending centrally into the depressed portion $G^3$ so as to form a pivot for the revoluble top G to turn on.

The revoluble top G is provided near its outer end and at its under side with an annular ring $G^4$ resting on rollers K journaled in brackets K' attached to the inner surface of the side of the heating chamber A. By the arrangement described the central portion of the flat top G is supported on the ball bearing I while the outer portion of the said top is supported on the rollers K, and hence the top G can be readily turned so as to bring any desired vessel H in front of the diner seated at the table C supporting the food and dish warmer. In order to permit of conveniently turning the top G the latter is provided with suitable handles L extending outwardly beyond the edge of the top G.

In order to protect the vessels H and the food contained therein, use is made of a cover or a hood N set on the top G and provided with openings for accommodating the handles L. When the food and dish warmer is used for providing the diners with the desired food, the cover N is removed to allow convenient access to the food contained in the vessels H. The bottom of the heating chamber is suitably reinforced by the use of angle irons O, as indicated in Fig. 4.

By arranging the burner chamber at one side of the heating chamber and providing the revoluble top with openings and supporting the cooking vessels in said openings the water of the heating chamber may be kept at different temperatures at different parts of said chamber, and by extending the cooking vessels below the surface of the water and revolving the top the heat of the burner chamber may be distributed or diffused throughout the body of the water.

The food and dish warmer shown and described is very simple and durable in construction, and is composed of comparatively few parts, not liable easily to get out of order.

Having thus described my invention, I claim as new and desire to secure by Letters Patent:

1. A food and dish warmer, comprising a heating chamber adapted to be set on a table or other support, and adapted to contain water, said chamber being provided with a revoluble top having marginal openings for the reception of vessels containing the food to hold the said vessels suspended in the heating chamber, the central space of the said top being unobstructed for the storing of dishes, and heating means arranged in the chamber at one side thereof.

2. A food and dish warmer, comprising a heating chamber adapted to contain water and adapted to be set on a table, a burner chamber within the heating chamber at one side thereof, a revoluble top for closing the said heating chamber and provided with a series of openings, and vessels set in the said openings and having flanges seated on the said top to suspend the vessels within the heating chamber.

3. A food and dish warmer, comprising a heating chamber adapted to contain water and adapted to be set on a table, a burner chamber within the heating chamber, a central post in the said heating chamber and provided on its upper end with a bearing, a series of rollers journaled on the inner face of the side of the said heating chamber, a revoluble flat top mounted to turn on the said post and resting on the said rollers, the said top having marginal openings, and vessels set in the said openings and supported by the said top to revolve with the same.

4. A food and dish warmer, comprising a heating chamber adapted to contain water, a revoluble top on the chamber and having openings adjacent its periphery, vessels in the openings of the top and extending into the said chamber, and a burner chamber arranged in the heating chamber at one side thereof for heating the water of said chamber.

5. A food and dish warmer, comprising a heating chamber adapted to contain water and having in one side an opening closed by a door, a revoluble top on the chamber and having adjacent to its periphery a plurality of openings for the reception of vessels, and a burner chamber within the heating chamber and having an opening registering with the opening thereof.

6. A food and dish warmer, comprising a chamber adapted to contain water and having in one side an opening closed by a door, a burner chamber secured to the inner face of the water chamber at opposite sides of the opening thereof and extending into the said chamber, a central post in the water chamber, and a revoluble flat top mounted to turn on the said post and having adjacent its periphery a plurality of openings to receive vessels containing the food.

In testimony whereof I have signed my name to this specification in the presence of two subscribing witnesses.

JOSEPH WILLIAM STAGNER.

Witnesses:
J. L. VESTAL,
S. L. PATTERSON.

Copies of this patent may be obtained for five cents each, by addressing the "Commissioner of Patents, Washington, D. C."